June 18, 1940.   O. W. RANDOLPH   2,205,175
TRANSIT TREATING OF MATERIAL
Filed Oct. 24, 1938
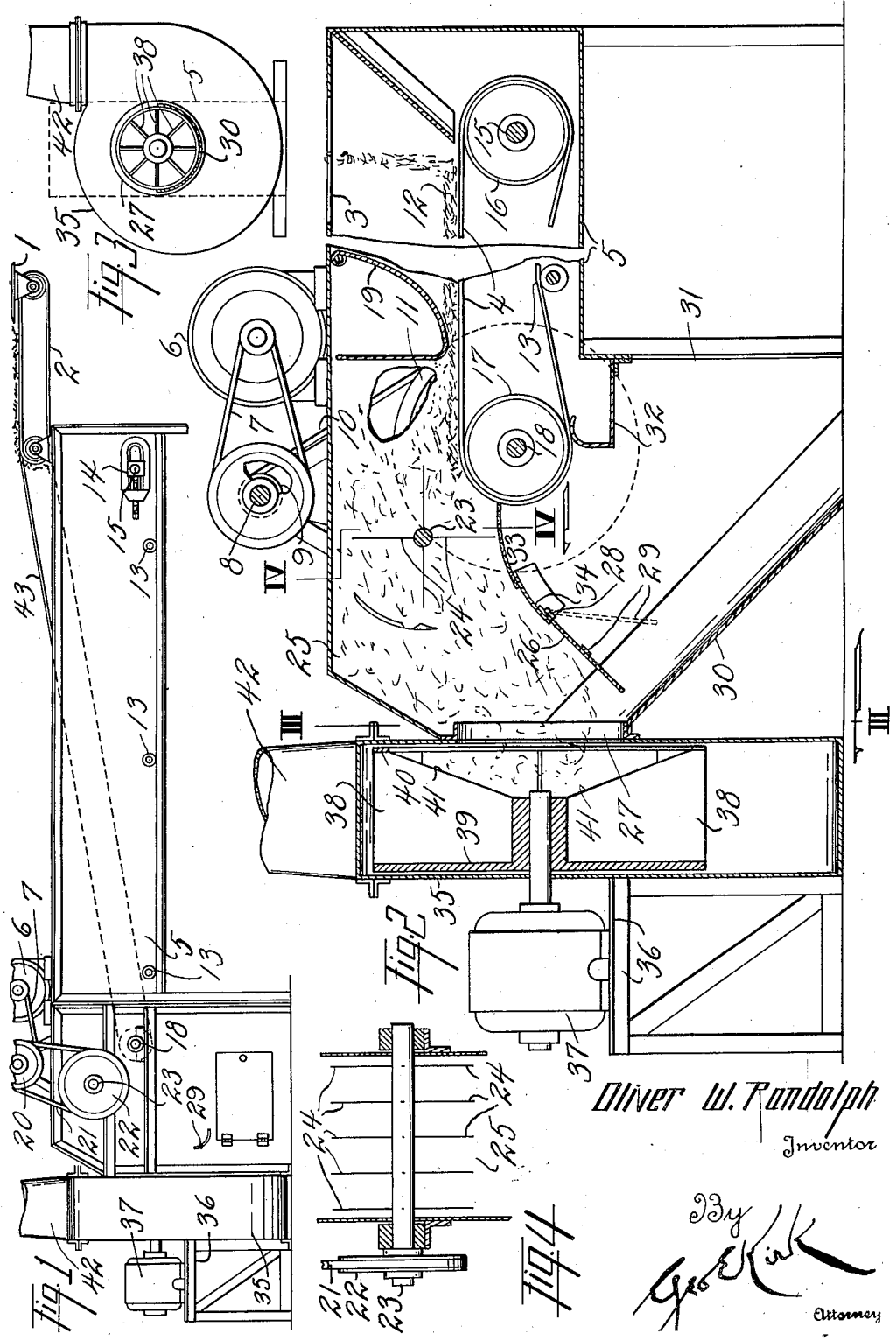

Patented June 18, 1940

2,205,175

UNITED STATES PATENT OFFICE 2,205,175

TRANSIT TREATING OF MATERIAL

Oliver W. Randolph, Toledo, Ohio

Application October 24, 1938, Serial No. 236,731

1 Claim. (Cl. 209—147)

This invention relates to handling bulk material in conjunction with simultaneously subjecting such material to treatment.

This invention has utility when incorporated in reduction of moisture content, control of temperature, removing of foreign material as from food, say fodder.

Referring to the drawing:

Fig. 1 is a fragmentary view in side elevation of an embodiment of the invention;

Fig. 2 is an enlarged view, with parts broken away, of the picker and with delivery connections therefor;

Fig. 3 is a view on the line III—III, Fig. 2, showing the fan and the intake thereto; and Fig. 4 is a section on the line IV—IV, Fig. 2, showing the picker or fluffing means.

Supply material hereto may be taken as say fodder. In the instance such be alfalfa, it may be cut into two inch lengths or approximately such and, whether sun dried or direct from dehydrator 1, the spill thereof may be to conveyor 2 for discharge through opening 3 to conveyor 4 in housing 5. Motor 6 through belt 7 to shaft 8 actuates pulley 9 effective through belt 10 and pulley 11 to drive upper reach of conveyor 4 so that this material 12 as falling thereon may be progressed therealong. This endless conveyor 4 is shown as having lower reach directing idlers 13. Furthermore, there is tension adjusting means 14 for shaft 15 as carrying pulley 16 for the receiving end of this belt or mechanical conveyor 4 to progress this stock as the conveyor 4 passes about drive pulley 17 on shaft 18 fixed with the pulley 11. This stock or material 12 is so conducted as to approximate a uniform thickness layer and near its discharge has swingable partition or valve 19 to cut off this discharge from the upper reach supply portion and the intake opening 3.

This shaft 8 has additional pulley 20 thereon, from which extends belt 21 to pulley 22 on shaft 23 having radial rods or picker means 24 therefrom. In the preferred set-up herein, as adapted for handling say alfalfa clips or cuttings, the lineal velocity of the free ends of these pickers 24 is some three or four times, or even more, the rate of supply of the material from the conveyor 4. For instance, this belt 4 may travel at say two hundred and fifty feet per minute and the pickers 24 with say one foot radius may have R. P. M. of around two hundred and fifty. The direction of rotation for this shaft 23 is counterclockwise and thereby against the direction of receipt of material 12 from the conveyor 4 and throws such upward in the chamber 25 of this housing 3 and picks apart or fluffs this mass as so vigorously thrown that it may drop toward chute 26 as directed toward fan intake opening 27.

This section 26 has hinge mounting 28 and from exterior of the housing there is adjustable handle 29 permitting rocking of this control to vary clearance as to chute 30 therefrom. This adjustment is to permit variation in the direction and velocity of incoming air from opening 31. This air may not escape to the lower reach of the conveyor belt 4 due to the deflector 32. This incoming air may not escape directly to the picker due to flexible deflector section 33 and fixed deflector section 34. Accordingly, this rush of incoming air has upward course in the chute 30 to carry with it the hay particles and light material for flow through fan intake opening 27, while the heavier foreign particles such as fragments of earth, stone, metal parts, or other heavier or foreign material, may thus be separated in falling downward along this chute 30 for removal by opening 31 as accumulating in this housing.

This fan intake opening 27 is to housing 35, adjacent which is platform 36 mounting motor 37 to which is directly connected fan having radial blades 38 between disk 39 and ring 40. These blades 38 have re-entrant portion 41 adjacent the intake opening 27 so that at the high speed of rotation the incoming material is by the air supply thrown in this housing 35 to pass upward in pneumatic conveyor 42. This air supply through the opening 31, in the event the supplied stock be say sun or weather cured, may be so controlled that there is further dehydration or moisture removal effected. In the event the supply of material be from a dehydrator and the temperature be still of such an extent that there may be fire hazard, this mixing of the incoming air therewith may be thus effective in allaying injury from such source to pull down this temperature and the hazard therefrom.

In the operation hereunder, there may be a supply of material continuously to a mechanical conveyor 4 for uniform rate delivery to a relatively high speed picker which is not only a loosener to disperse the incoming mass but is effective to free the higher gravity portions as thrown about in the chamber 25 for falling down the chute 30, but allow such hay or matter that is to be retained to have dispersed therethrough a treatment effecting air volume for the desired control, say temperature reduction or moisture removal. This transit treatment of the material is thereby a simple introduction of factors for control in transferring the material, say to be stored or to be given sub-division treatment as from milling operation. This pre-aerating and removal of particles are of exceptional value in the event of milling as reducing the untoward hazards effected by foreign particles in the mill. Furthermore, there is fire safety provision effected hereunder.

For convenience, the conveyor 2 may be driven by belt 43 extending from the shaft 18.

What is claimed and it is desired to secure by Letters Patent is:

Material transfer equipment embodying a belt conveyor, a downwardly extending deflector section for receiving discharge therefrom, a rotary picker and throw device above the deflector, a drive for the device at a speed in excess of the conveyor delivery thereto in a direction to lift the delivery material from the conveyor to pass upward over the device and be thrown by the picker and throw device, a housing for the device and deflector and into which the conveyor extends, a chute toward which the deflector extends to provide clearance for air intake into the housing, a suction fan upwardly toward which the chute extends, said fan having port communication with the housing at the chute, and a delivery passageway from the housing for fan effectiveness in withdrawing lighter portions from the housing as fluffed by the device, while leaving the heavier portions to be carried from the housing by the deflector and chute.

OLIVER W. RANDOLPH.